Aug. 4, 1931. M. F. CARR 1,817,886
FASTENER FORMING AND ASSEMBLING MACHINE
Filed Sept. 29, 1927 9 Sheets-Sheet 6
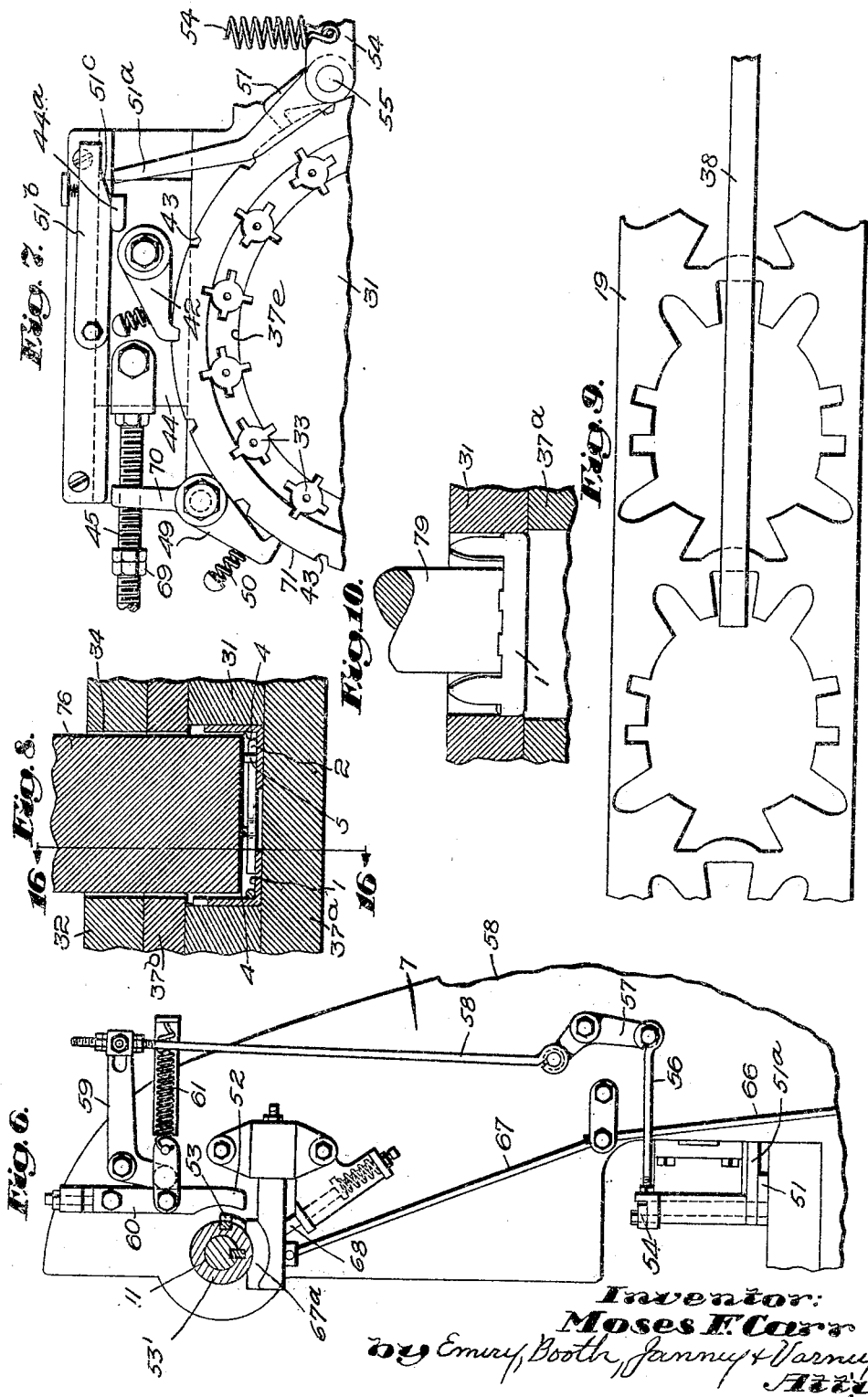

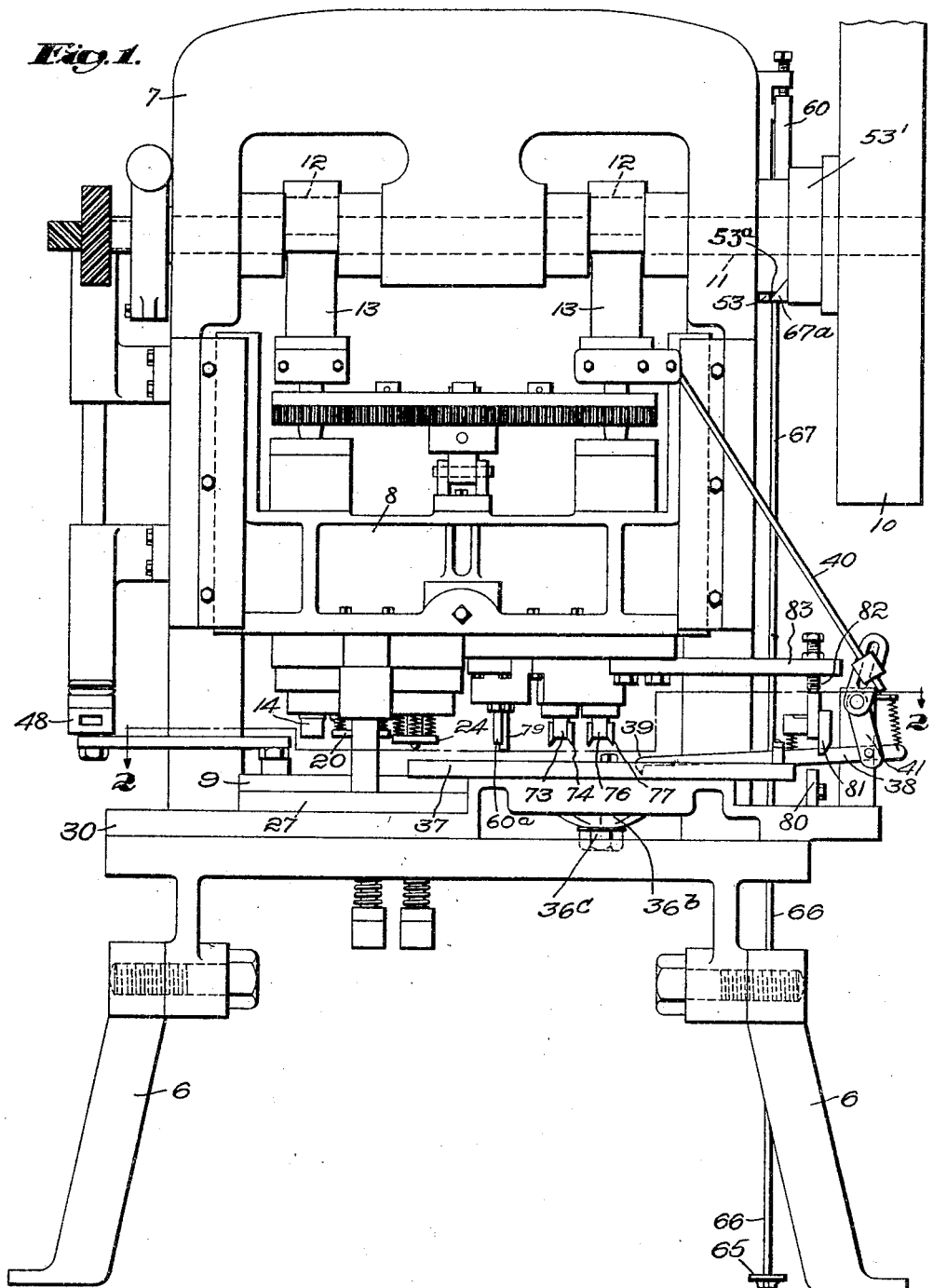

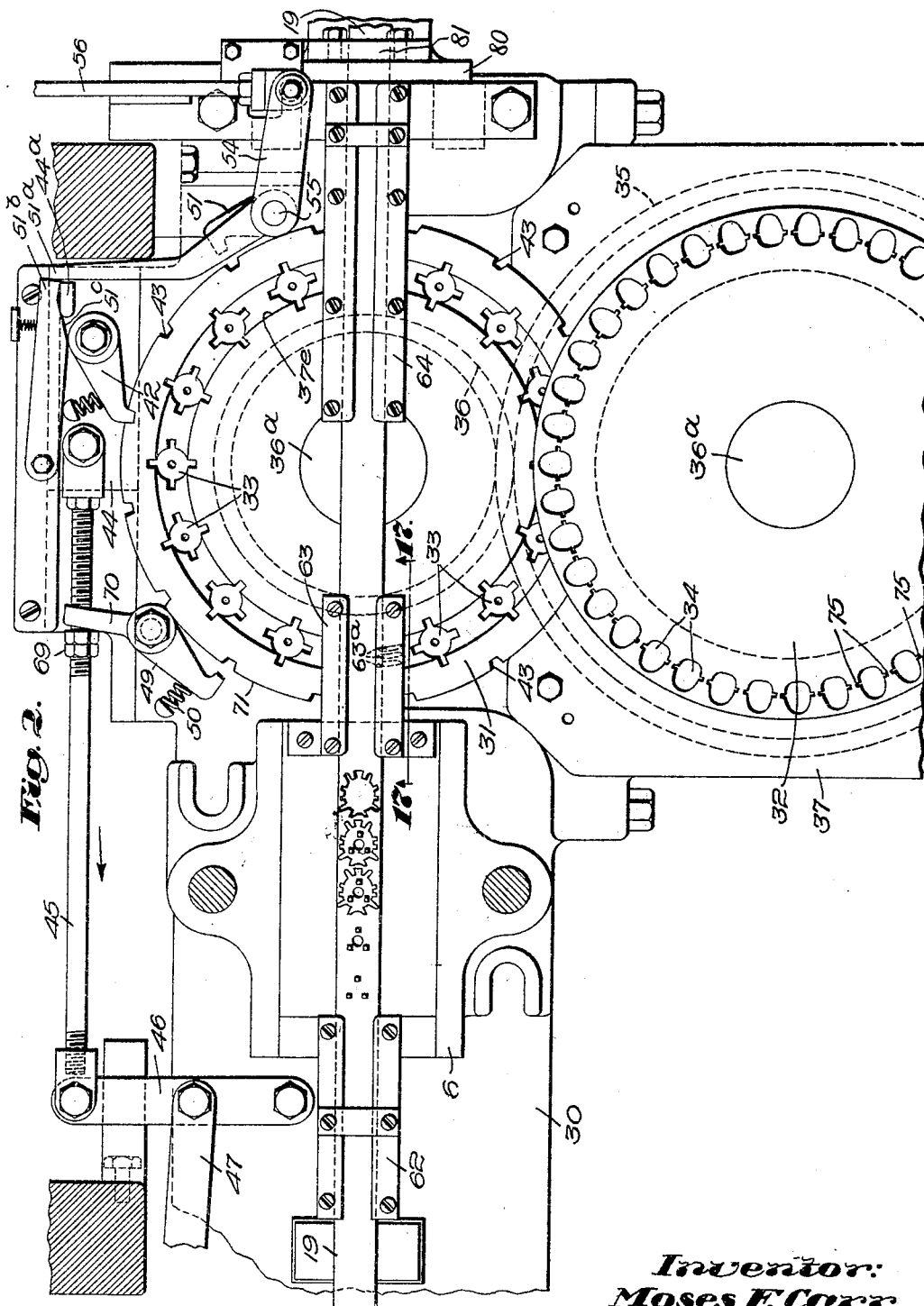

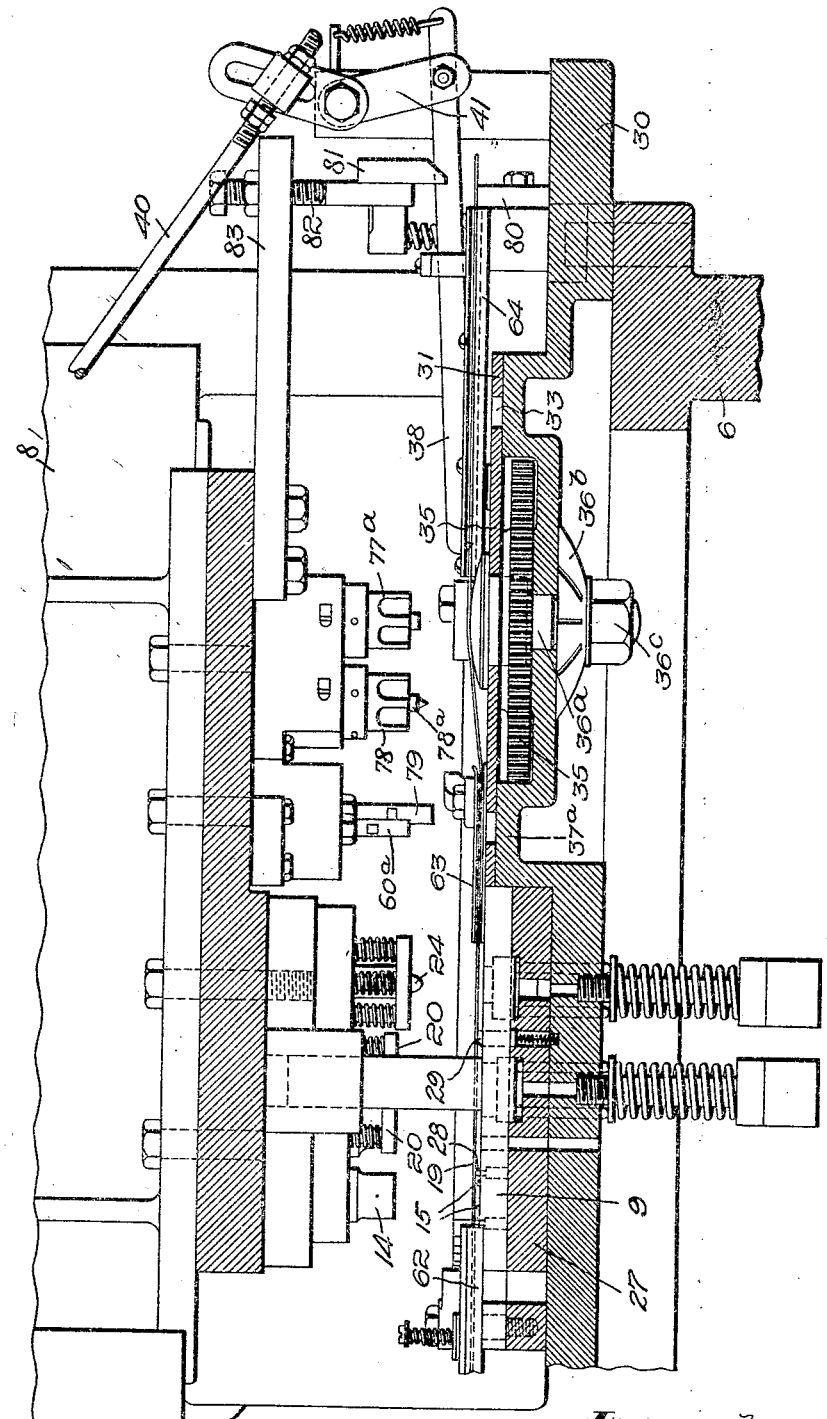

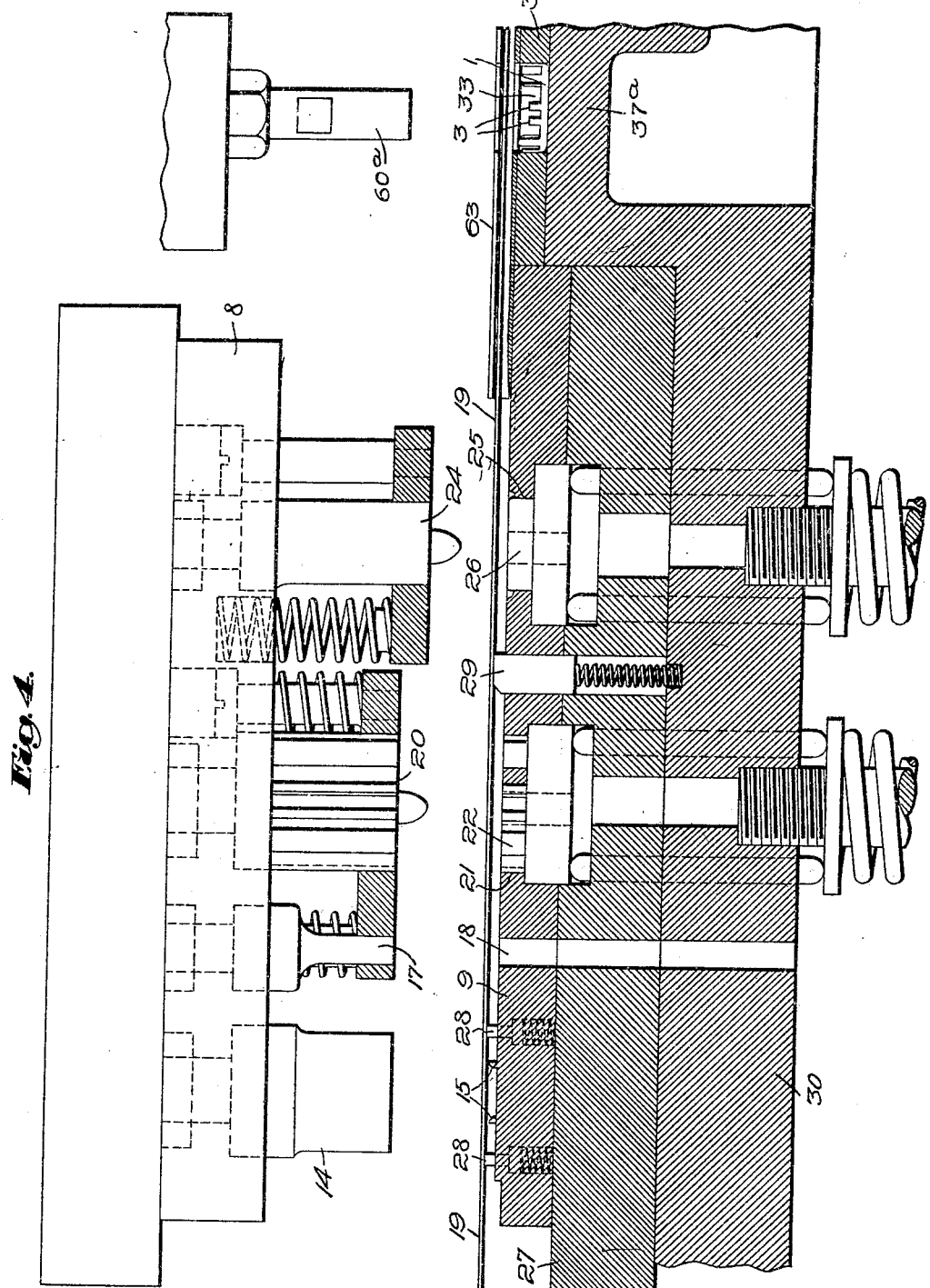

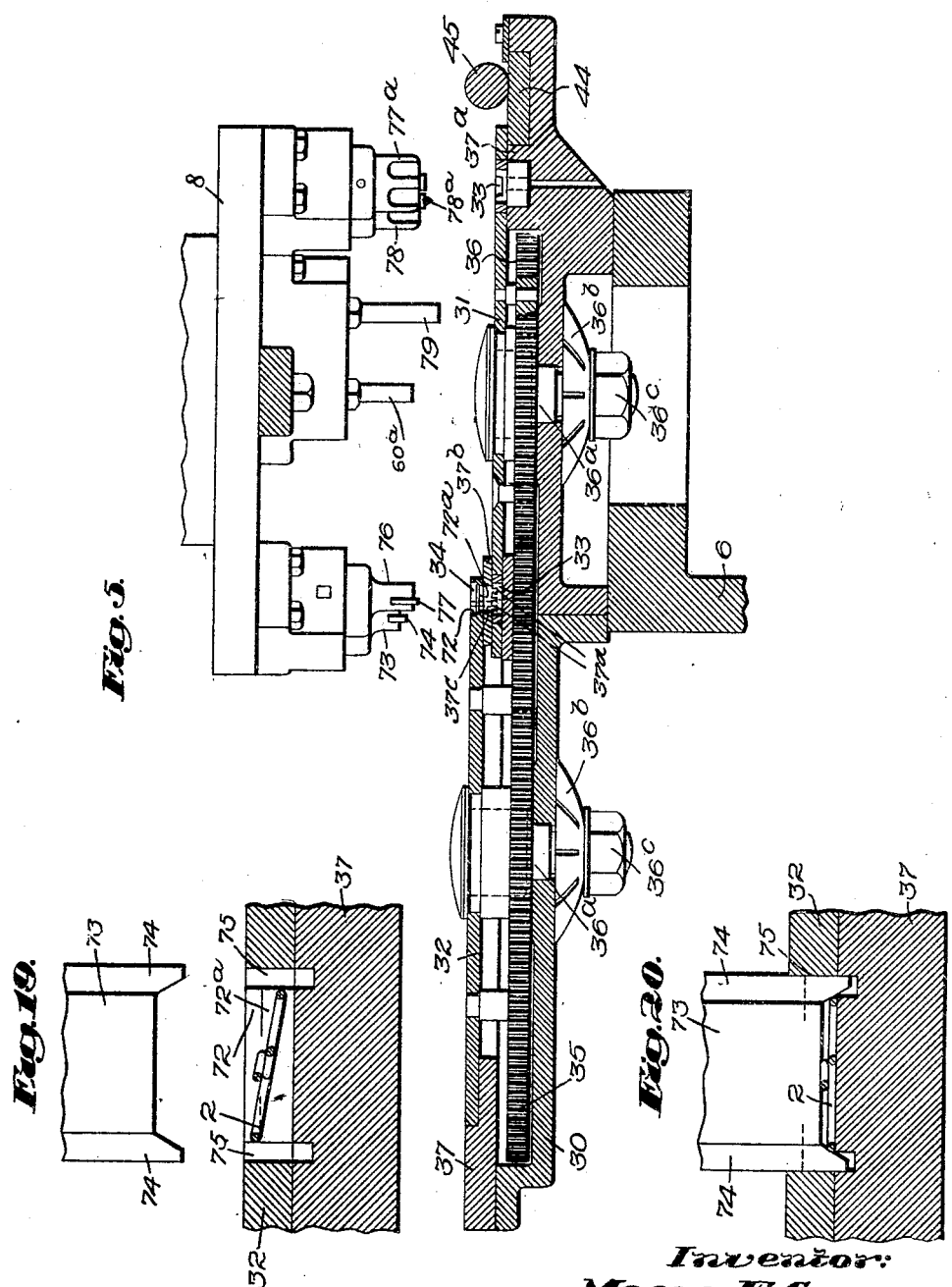

Aug. 4, 1931.     M. F. CARR     1,817,886
FASTENER FORMING AND ASSEMBLING MACHINE
Filed Sept. 29, 1927     9 Sheets-Sheet 7
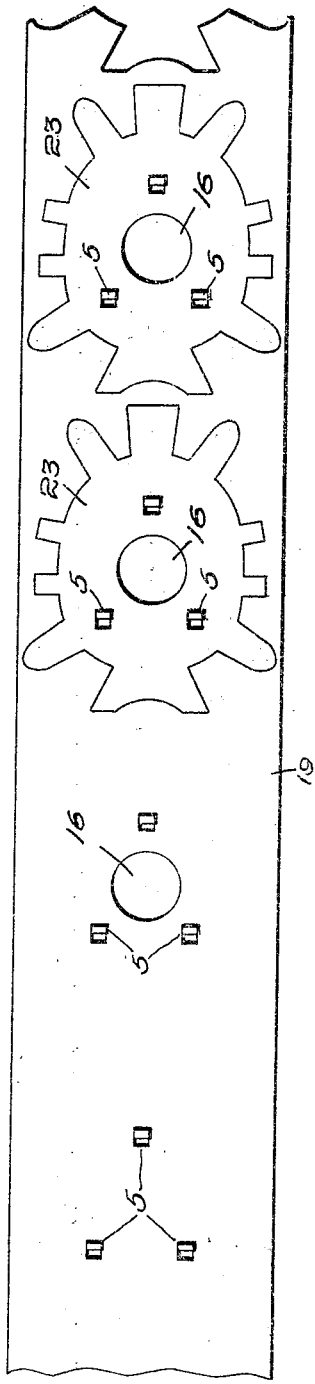
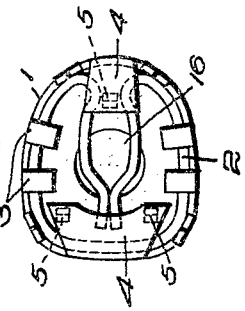
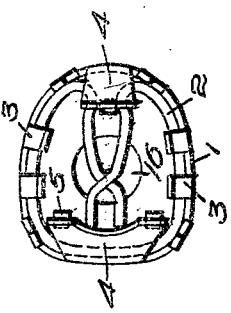
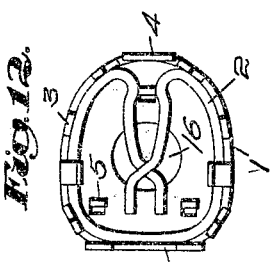
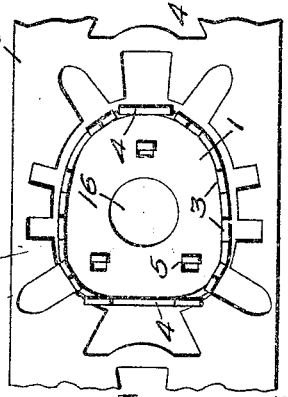
Inventor:
Moses F. Carr
by Emery, Booth, Janney & Varney
Attys

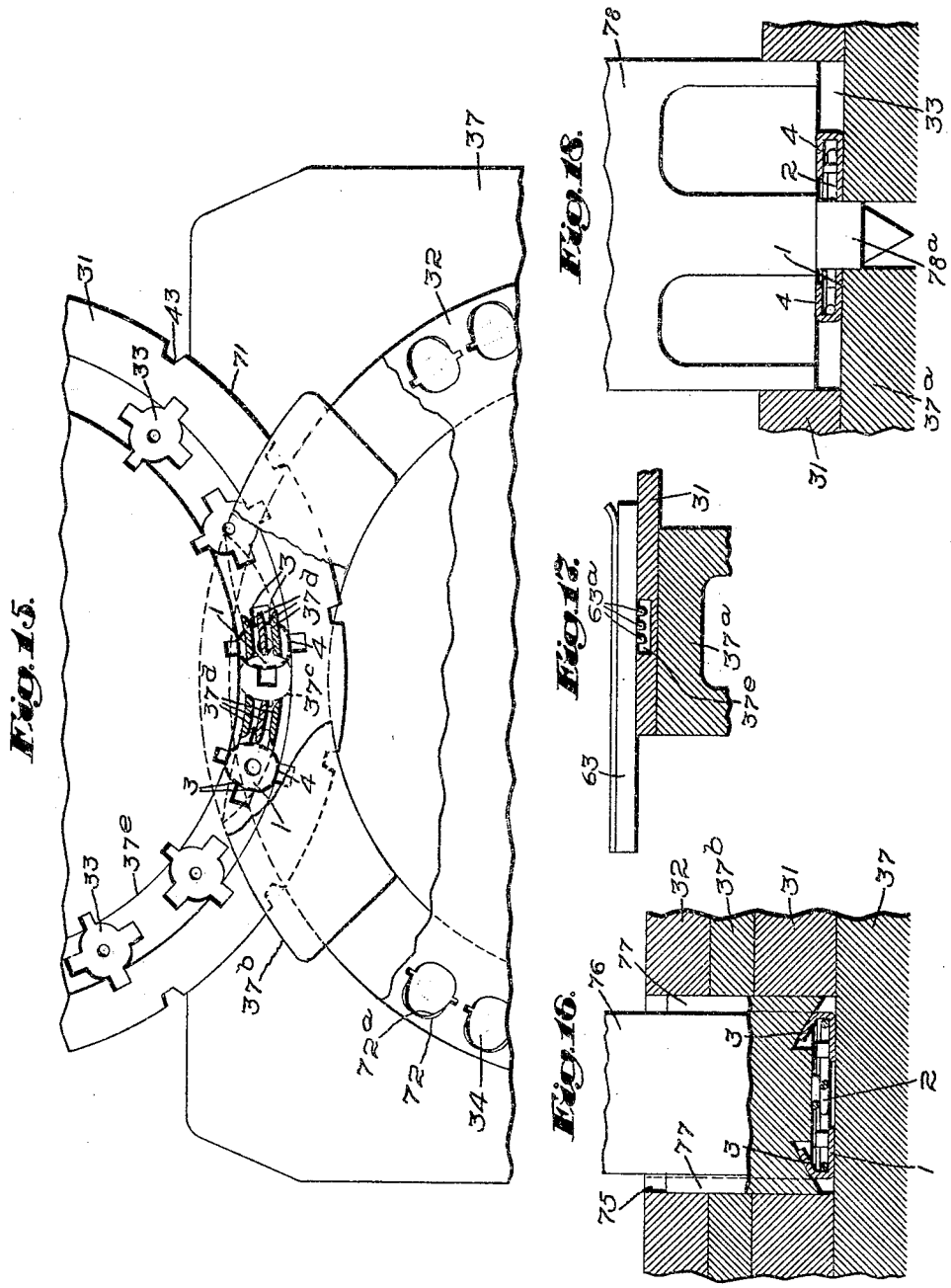

Aug. 4, 1931.  M. F. CARR  1,817,886
FASTENER FORMING AND ASSEMBLING MACHINE
Filed Sept. 29, 1927    9 Sheets-Sheet 9
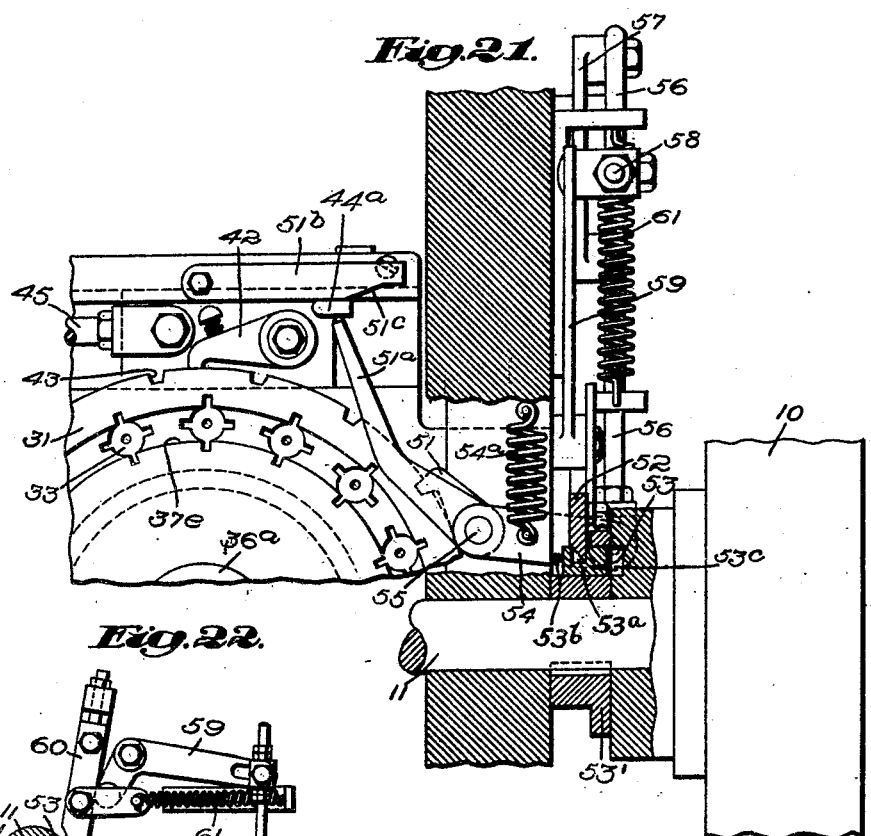
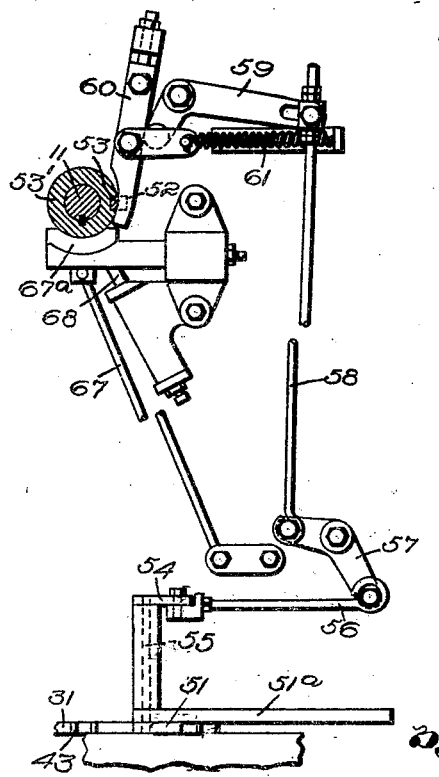
Inventor:
Moses F. Carr
by Emery, Booth, Janney & Varney
Attys Patented Aug. 4, 1931

1,817,886

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER FORMING AND ASSEMBLING MACHINE

Application filed September 29, 1927. Serial No. 222,918.

My invention aims to provide an improved automatic machine for assembling snap fastener elements, and more particularly to a machine adapted to form a socket casing part and then automatically assemble a spring in the casing part.

In the drawings, which illustrate a preferred embodiment of the invention:—

Figure 1 shows a front elevation of the machine;

Fig. 2 is an enlarged view taken on the line 2—2 of Figure 1, parts of the machine being broken away;

Fig. 3 is part sectional and part elevational view taken along the line of travel of the strip from which the casing elements are formed, the upper and lower portions of the machine being broken away;

Fig. 4 is an enlarged view showing the means for forming the casing elements, some parts being shown in cross-section and other parts being shown in elevation;

Fig. 5 shows the spring-carrying table and casing-carrying table in cross-section and shows the driving gears together with the supporting means and also shows, in elevation, various associated die members;

Fig. 6 is an elevation showing a portion of one side of the machine and the connecting elements which operate the clutch which connects or disconnects the main drive shaft of the machine with the driven pulley, the pulley being omitted;

Fig. 7 is a plan view of a portion of the casing-carrying table and also shows the position of parts of the means for driving the table and the safety stop means just after the safety stop latch has been released;

Fig. 8 is an enlarged section taken through the two tables at their intersection to show how the spring is transferred to the casing;

Fig. 9 is a detail plan view showing the hook in position for moving the strip from which the casing parts are pressed;

Fig. 10 is a detail section through the table 31 showing the opening through which the socket is ejected, together with the ejecting means;

Figs. 11 and 11ª show an elarged plan view of a portion of the strip from which the fastener casings are formed;

Figs. 12, 13 and 14 show plan views of a socket illustrating the various steps in clenching the spring-retaining portions of the casing;

Fig. 15 is a plan view showing portions of the fastener-carrying tables, the spring-carrying table being broken away at the intersection of the tables to show the plate which lies between the two tables this plate being broken away on the central portion thereof to show, in cross section, the means depending therefrom for registering the casing and for pressing the spring into the casing;

Fig. 16 is a section on the line 16—16 of Fig. 8 showing two of the ears of the casing bent inwardly to hold the spring in assembly with the casing;

Fig. 17 is a section taken on the line 17—17 of Fig. 2 to show the means for registering the casing in proper relation to an aperture in the casing-carrying table;

Fig. 18 is a section showing the means which press the spring-holding ears of the casing into their final positions;

Fig. 19 is a section taken through the spring-carrying table beneath the spring-registering plunger;

Fig. 20 is a section similar to that shown in Fig. 19, but showing the plunger operated to position a spring in a spring-carrying aperture;

Fig. 21 is a plan view of a portion of the machine showing a portion of the casing-carrying table, the means for driving the casing-carrying table and the safety stop means in elevation and also showing, in cross-section, a portion of the frame of the machine, the clutch and the elements with which the clutch cooperates; and Fig. 22 is a side elevation of the safety stop mechanism showing the clutch-ejector shown in engagement with the clutch, together with the part which carries the clutch, which parts are shown in cross-section.

Referring to the embodiment of my invention, illustrated in the drawings, I have shown a machine of the automatic type for forming the casing parts of snap fastener elements, assembling springs with the casing parts and delivering the fastener elements complete from the machine.

The particular machine illustrated is for making the casing and assembling the spring therewith of a fastener socket of the type shown and described in the United States patent to Moses F. Carr, No. 1,514,578, issued November 4, 1924. This socket, as illustrated in Fig. 14, includes a casing 1 and spring 2. The casing is formed from a single piece of metal and is provided with narrow portions or ears 3 and wide portions or ears 4 for holding the spring 2 in the casing. The ears 4 are supported by struts 5 formed from the front face of the casing, as clearly shown in Fig. 11ª.

The machine, which I have illustrated for forming and assembling the particular type of socket above referred to, is provided with a standard 6, supporting a frame 7 and certain other parts of the machine more fully hereinafter described.

The frame 7 supports and guides a vertically movable head or carriage 8 carrying a set of dies for forming the fastener element casings from thin sheet material fed through the machine. A set of cooperating dies are located in a plate 9 supported by the standard 6, as best illustrated in Figs. 3 and 4.

The driving means for reciprocating the carriage 8 includes the main driving pulley 10 (Fig. 1), which may be driven in any suitable manner, a main drive shaft 11 being mounted in bearings in the frame 7. The pulley 10 is secured to one end of the shaft 11, and a pair of eccentrics 12—12 reciprocate the carriage 8 through the connecting rods 13—13, all as shown in Fig. 1.

The dies for forming the casing are provided in pairs, and for the purpose of forming the casing I have shown, in Fig. 4, four pairs of dies. Reading from left to right (Fig. 4), I have provided a pair of dies for forming the struts 5 in the casing 1. These dies include the upper female die 14 and the lower male die 15. The second pair of dies are for forming the stud-receiving aperture 16 in the casing 1 and include the upper male die 17 and the lower female die, in the form of a hole 18 in the plate 9. The third set of dies cut the casing in outline from the strip of metal 19 and include the upper male die 20 and the lower female die 21. This female die 21 has associated therewith a movable spring-pressed plunger 22 for returning the cut-out casing blank 23 (Fig. 11) to the strip again. The fourth set of dies are for forming the blank 23 into the form of casing 1, as shown in Fig. 11ª. These dies include the upper male die 24 and the lower female die 25. The female die 25 also has a spring-pressed plunger 26 for returning the casing to the strip 19.

The plate 9 supports all of the lower die members and rests upon a second plate 27 to form a convenient assembly for holding the plungers 22 and 26 in position. Spring-pressed plungers 28 and 29 are also assembled with the plates 9 and 27 to bear against the under side of the strip 19 and hold it away from the male portions of the die 15. The plates 9 and 27 are supported directly by the bed plate portion 30 of the standard 6, as clearly indicated in Figs. 3 and 4.

That part of the machine (Fig. 2) which is used to assemble the spring 2 with the casing 1 includes two rotatable tables supported by the bed plate portion 30 of the machine. These tables are positioned with relation to each other in such manner as to permit one portion of one table to overlie a portion of the other table. One of the tables I will call the casing-carrying table 31 and the other the spring-carrying table 32. The latter is located in a horizontal plane above the former, as shown in Figs. 2 and 5.

The casing-carrying table 31 is provided, adjacent its periphery, with a series of vertical bores 33 into which the casing 1 may be ejected from the strip 19. The spring-carrying table 32 is also provided with a series of vertical bores 34 adjacent to its periphery for receiving the springs 2. The bores 33 and 34 of the tables are adapted to register when the tables are rotated. Below the tables 31 and 32, I have provided gears 35 and 36 which are meshed and connected with the tables so that when one table is turned the other will be turned also. Thus, the bores of one table must register properly with the bores of the other, as the tables are rotated. Each table rotates about a pivot 36ª (Fig. 5) passing through the bed plate 30, and each is provided with suitable friction means here shown in the form of a cup-shaped spring 36ᵇ bearing against the bed plate 30 with a nut 36ᶜ for adjusting the tension of the spring.

In each table the fastener element-receiving bores pass entirely therethrough, so that the fastener parts rest upon stationary bed plates 37 and 37ª. The fastener parts are carried around by the rotatable tables 31 and 32 while resting upon the bed plates 37 and 37ª. A portion of the bed plate 37 is cut away at the intersection of the tables 31 and 32 and a separate plate 37ᵇ is inserted. This plate 37ᵇ is attached to the plate 37, as shown in Fig. 15, and is located in a plane between the two tables 31 and 32, as shown in Figs. 5, 8 and 16. An aperture 37ᶜ the shape and size of the inside of the casing is provided in the plate 37ᵇ and beneath the plate adjacent to the aperture at opposite sides I have provided a number of guides 37ᵈ formed integral with the plate 37$^b$, as shown in cross-section in Fig. 15 and in elevation in Fig. 5. The guides 37$^d$ project into the groove 37$^e$ formed in the table 31 into the path of the ears 3 and 4 and attaching prongs of the casing (Fig. 15) so that the casings will be properly registered beneath the aperture 37$^c$ in the plate 37$^b$.

The strip 19 is moved beneath the casing-forming dies by means of a mechanism shown at the right of the machine (Fig. 1). This mechanism includes an arm 38 having a hook 39 at one end for engagement in an aperture in the strip 19 (Fig. 9), and the arm is moved back and forth longitudinally of the strip as the carriage moves up and down. One end of a rod 40 is connected to the carriage 8 and the other end is connected to one end of a bell-crank 41, adapted to be operated by the movement of the rod 40 with the carriage 8. The other end of the bell-crank 41 is connected with the arm 38 for operation thereof.

The tables 31 and 32 are turned intermittently to correspond with the intermittent movement of the strip 19. Thus, there is a pause in the turning of the tables which is sufficient to permit the operation of the various dies and transferring mechanisms, which also will be more fully hereinafter described in connection with the operation of the machine.

The mechanism for turning the casing-carrying table 31 includes the spring-pressed latch 42 for engagement in the notches 43 in the edge of the table 31. This latch 42 is pivoted upon a sliding plate 44 mounted for sliding operation in the bed of the machine, and the plate 44 is reciprocated by the rod 45 connected through the levers 46 and 47 with the crank shaft 48. A second latch 49 is pivoted upon the bed of the machine and acts as a safety lock to regulate turning of the table by the latch 42. The latch 49 is adapted to be forced into one of the notches 43 by the spring 50, thereby stopping the table in the proper position for operation of the various die and transfer devices carried by the carriage 8, as shown in Fig. 2.

I have also provided safety means for preventing operation of the machine, if for some reason the tables 31 and 32 do not move to their proper positions under the various dies carried by the carriage 8. This means is in the form of an escapement 51, which is adapted to snap into the notches in the table 31 as it turns. The escapement controls a clutch-ejector 52 (Figs. 6 and 21) to throw out the clutch 53, thereby stopping the operation of the machine. Any suitable connections may be made between the escapement 51 and the ejector 52, but I have shown, in Figs. 2, 6 and 22, a link 54 pivoted upon the pivot 55 and rigidly connected to the escapement 51, a rod 56 connecting the link 54 to the bell-crank 57 and a second rod 58 connecting the bell-crank 57 with a second bell-crank 59 (Fig. 6). The second bell-crank 59 has one end bearing against a pivoted link 60 pulled against the bell-crank by means of a spring 61. The free end of the link 60 is located adjacent to the clutch 53 and provides the clutch-ejector 52 which is adapted to be moved into the path thereof when the safety lock mechanism is operated.

Referring to Figs. 2 and 7, I have shown a finger 51$^a$ operatively connected to the escapement latch 51. The free end of this finger is adapted to cooperate with a second finger 51$^b$ pivoted on the bed of the machine adjacent to the block 44, as shown in Fig. 2. When the parts of the machine are in the position shown in Fig. 2, the finger 51$^b$ has its end bearing against the finger 51$^a$ to prevent the latch 51 entering a notch 43 in the table 31. The fingers 51$^a$ and 51$^b$ remain in this relation until the block 44 moves to the left (Fig. 7) sufficiently to permit the cam piece 44$^a$ to act upon the cam edge 51$^c$ of the finger 51$^b$ and move it out of the way of the finger 51$^a$, so that the latch 51 may engage the edge of the table 31 and be ready to drop into the next notch 43 and stop the machine if the table 31 gets out of time with the carriage 8. The finger 51$^b$ is held out of the way of the finger 51$^a$ until the block 44 returns and the cam 44$^a$ moves the finger 51$^a$ to the right to prevent the latch 51 from entering a notch 43. This escapement or safety lock mechanism, in the normal operation of the machine, is so operated that the latch 51 does not enter the notches 43 in the table 31 and, therefore, the clutch-ejector 52 does not come in contact with the clutch 53 to disengage it from the driving pulley 10. The clutch 53, previously referred to, is best illustrated in Figs. 21 and 22 and is mounted in a groove provided in a collar 53' keyed to the main drive shaft 11, as best shown in Fig. 21. The main driving pulley 10 is provided with one or more notches 53$^c$ with which the clutch may engage thereby to lock the driving pulley (which is mounted loosely on the driving shaft 11) with the drive shaft 11 through the collar 53'. The clutch 53 is also provided with a transverse groove 53$^a$ into the path of which the ejectors 52 and 67$^a$ may be moved to move the clutch 53 out of engagement with the pulley 10.

I will now describe more fully the operation of a complete cycle of the machine from the time it starts until a casing part has been formed, a spring automatically placed in the casing, the means for holding the spring have been clenched and the completed socket element has been ejected from the machine.

In the first place, the strip 19, which is fed to the machine from a roll (not shown) is threaded through the guides 62, 63 and 64, as shown in Fig. 2, so that one end projects beyond the right-hand edge of the machine as indicated.

It will be understood, of course, that the machine will not function fully until after the strip 19 has been punched sufficient times to have an opening adjacent to the end of the strip-feeding bar, and, therefore, let us assume that the preliminary operation has taken place and that the hooked end of the feed bar is engaged with the strip, as shown in Fig. 9.

The machine is now ready for automatic operation and the operator steps upon the treadle 65, shown in Fig. 1. The treadle is connected in the usual manner, as by the rods 66 and 67, with the clutch ejector 67$^a$, as shown in Fig. 6, so that when pressed downwardly the ejector will be pulled downwardly out of the groove 53$^a$ in the clutch 53 against the action of the spring-pressed plunger 68 and the spring 53$^b$ (Fig. 21) will press the clutch into the recess 53$^c$, in the driving pulley 10, also shown in Fig. 21. Immediately the main shaft 11 begins to turn, and as the eccentrics 12—12 turn with it in the connecting rods 13—13, the carriage to which the connecting rods are secured will be driven downwardly.

While all of the various forming, shaping, transferring and ejecting dies carried by the head or carriage operate at the same time to do their particular work, I shall now proceed to describe the various operations which take place to form a complete socket casing. In this manner, I believe the operation of the machine will be more clearly understood.

Beginning with the strip 19 as it passes between the first set of dies 14 and 15, after the machine has been set in operation, the die 14 descends and presses the strip 19 against the three upstanding portions of the die 15, thereby punching out the struts 5, as shown in Fig. 11. During the upward movement of the carriage, the mechanism at the right of the machine (Fig. 1) operates to move the strip along between the dies so that the three struts 5 are positioned beneath the dies 17 and 18. Upon the next descent of the carriage 8, the die 17 punches the stud-receiving aperture 16 in the strip 19 between the struts, as shown in Fig. 11. The strip 19 is then again moved in the manner above stated and when the carriage descends the third time, the dies 20 and 21 cut the blank 23 (Fig. 11) from the strip 19. As the pressure upon the strip is released after this punching operation, the part 22 moves the blank 23 back into the strip so that it may be carried along between the next set of dies 24 and 25. Before the next punching operation takes place, however, the carriage makes a complete downward and upward movement without any action taking place upon the blank 23. This is merely to take care of the feeding of the strip because the next set of dies are spaced farther from the last mentioned set of dies than the spacing of the other dies. Between the dies 24 and 25 the casing is shaped into the form illustrated in Fig. 11$^a$ and when pressure is released, by retraction of the die 24, this casing 1 is moved from the die 25, by the spring-pressed part 26, to the strip 19 again, so that it may be carried along by the strip.

So far I have described the method of forming the completed socket casing 1 and the next step is the transferring of the casing to the casing table 31 where it may receive the spring. When the strip 19 has advanced to the point where a completely formed casing is directly under the transfer die or plunger 60$^a$, shown in Fig. 4, the casing will be forced by the plunger 60$^a$ into the opening 33 in the table 31 directly beneath it. As stated before, the table 31 is turned intermittently by the latch 42 when the slide 44 (Fig. 2) is reciprocated. Therefore, assuming that the casing is now in a bore 33 of the table 31, when the rod 45 is moved in the direction of the arrow, shown in Fig. 2, the latch 42 will turn the table and the latch 49 will be released by movement of the nuts 69 away from the tail 70. The end of the latch 49 will be forced against the edge 71 of the table 31 by the spring 50 and will drop into the next notch 43 as the block 44 reaches the end of its stroke. At this time another bore 33 will be located in position to receive a casing 1. The block 44 is then forced in the opposite direction (with no movement of the table) until the latch 42 drops into the next succeeding notch 43 and this action continues until a casing part 1 is aligned beneath the opening 37$^c$ in the bed 37 adjacent to the intersection of the tables 31 and 32, as shown in Fig. 5. As the table 31 is rotated and a casing carried thereby is moved beneath the guide 63, the ears 3 of the casing pass between the guiding portions 63$^a$, projecting downwardly from the bottom of the guide 63 (Figs. 2 and 17) into the groove 37$^e$ in the table 31, thereby registering the casing in proper relation to its carrying aperture 33 in the table.

The spring-carrying table 32 has, prior to this time, had springs 2 placed in its bores 34 and this may be done in any suitable manner. In this particular instance, the springs are placed in the bores by hand. The bores have two diameters, as shown in Fig. 15, the upper portion 72 being larger than the lower portion 72$^a$. Thus the springs may be entered easily into the upper portions 72 of the bores 34, because they are enlarged at the ends where the narrow ends of the springs enter and, therefore, do not hold the springs under tension. The lower portions of the bores 34 are smaller than the normal size of the spring so that, as each succeeding bore passes beneath the plunger 73 (Figs. 1 and 19), the opposed fingers 74 at the edge thereof enter the slots 75 (Fig. 20) at the edges of the bores 34 and properly position the springs in the bores. As the plunger 73 moves downwardly into a bore 34, the fingers 74, which are tapered at their lower edges, squeeze the spring and force it from the upper enlarged portion 72 of the bore (Fig. 19) to the lower portion 72ª of the bore 34 and against the bed plate 37 (Fig. 20) upon which the table 32 moves. Thus the springs are properly positioned in a horizontal plane and are held in the proper form to be transferred to the casings.

During further rotation of the tables 31 and 32 a spring-carrying bore becomes aligned with the opening 37ᶜ in the plate 37ᵇ attached to the bed plate 37, while at the same time an aperture carrying a casing is also aligned with the aperture 37ᶜ.

Now, assuming that a casing 1 is located in a bore 33 beneath the opening 37ᶜ and a bore 34 carrying a spring 2 is located above the opening 37ᶜ, the transfer plunger 76 (Figs. 8 and 16) upon its next descent will force the spring down through the opening 37ᶜ into the casing 1, as best shown in Fig. 8. At the same time, the fingers 77 at the sides of the plunger 76 will clench inwardly two of the narrow portions 3, as shown in Figs. 12 and 16. These portions 3 prevent the spring 2 from becoming disengaged from the casing as the table leaves this point.

Further intermittent reciprocation of the tables 31 and 32, in the manner above described, will move the casing and spring beneath the guides 37ᵈ, located at opposite sides of the aperture 37ᶜ, where the lower edges thereof will make contact with the spring on the casing and force it down into its proper position if it should spring upwardly slightly after the clenching of the ears 3 has taken place.

The next operation takes place when the casing and spring are located beneath the die 77ª. As this die 77ª descends it clenches inwardly the remaining spring-retaining portions 3 and 4 to positions shown in Fig. 13. Then the table turns until the casing is located beneath the die 78 which performs the final clenching operation upon the portions 3 and 4, as shown in Figs. 14 and 18. This die 78 is provided with a small end portion 78ª (Fig. 18) which passes between the jaws of the spring to spread them from the positions shown in Fig. 13 to the positions shown in Fig. 14 and as the jaw-holding portions 4 are bent downwardly the jaws are held in this latter position. The socket element is now complete and when the table is turned to a point where the bore, containing the socket, is directly beneath the ejecting die 79 it is forced downwardly through an opening in the bed 37ª (Fig. 10) to a receptacle (not shown) for the fastener elements.

While I have described the operation of the machine so far as the forming of one casing and the subsequent assembly therewith of a spring is concerned, it should be understood that, once the machine is in full operation, all of the various dies are operating to perform their various functions at each descent of the carriage 8. After the first socket is ejected, there is a continuous flow of these fastener elements from the machine.

The waste part of the strip 19 passes between two blades 80 and 81 at the right-hand side of the machine, as shown in Fig. 1, and during each downward movement of the carriage 8 the screw 82, carried by the arm 83 secured to the carriage, strikes the movable blade 81 and forces it toward the fixed blade 80 to shear off a piece of the strip which extends between the blades.

During the operation of the machine, as above described, if, for any reason, the table 31 is not being turned in proper timed relation to the descent of the carriage 8 which carries the various die and transfer means, the safety latch 51 will ride along the edge of the table 31 until a notch 43 comes beneath the end of the latch which will be forced by the spring 54ª (Fig. 21) into the notch, thereby acting through the connections 54, 56, 57, 58, 59 and 60, respectively, (Figs. 6 and 22) to move the clutch-ejector 52 into the path of the groove 53ª of the rotating clutch 53, as shown in Fig. 22. The clutch-ejector 52 will then move the clutch axially out of engagement with the driving pulley 10 thereby automatically stopping the operation of the machine. This operation of the safety stop mechanism is clearly illustrated by Figs. 21 and 22 which show the latch 51 engaged in a notch 43 and the clutch-ejector 52 engaged in the groove 53ª in the clutch 53.

While I have shown and described a preferred embodiment of my machine, together with the operation thereof, I do not wish to be limited thereto, as my invention is best described in the following claims.

Claims:

1. In a machine for assembling snap fastener socket elements each of which includes a casing and a spring, a rotary spring-carrying table having a bore for receiving a spring, a casing-carrying device, spring-positioning means operable axially into and out of said bore thereby accurately to position a spring therein and transfer means independent of said spring-positioning means and operable to move said spring from its carrying table to a casing carried by the casing-carrying mechanism.

2. In a machine for assembling snap fastener socket elements, each of which includes a casing part having a number of upstanding prongs and a spring part, a series of dies for forming the casing parts of the fastener sockets, a rotatable table having a series of recesses for carrying the casing parts of the fastener sockets in a circular path, a second rotatable table having recesses carrying the spring parts of said fastener sockets in a circular path, automatically operating means associating with each of said tables and operable in the paths of movement of the fastener parts when carried around by said tables for positioning each of the socket parts relative to their respective tables prior to transfer and assembly of the socket parts and other automatically operating means operable to transfer said spring parts of the fastener sockets to said casing parts and having means for upsetting some of the projections on each of the casing parts to secure said springs therein.

3. In a machine for assembling snap fastener elements, a rotary casing-carrying table having a series of casing-carrying recesses, a rotary spring-carrying table having a series of spring-carrying recesses, gears connecting said tables so that rotation of one produces rotation of the other, notches formed in the edge of one of said tables, a reciprocable mechanism having a latch for engagement with said notches to move said table step by step whereby the recesses of said tables are brought into axial alignment for transfer of the springs to the casings and a second latch operably connected to said reciprocable mechanism and adapted to engage the said notches to insure a predetermined step by step rotation of the tables.

4. In a machine for assembling snap fastener elements, a casing-carrying table having a series of casing-receiving recesses, means located above said table for performing various operations upon said casings during rotation of said table, notches formed in the edge of said table, a reciprocable mechanism having a latch for engagement with said notches to move said table step by step beneath said means located above said table, a second latch for engagement with said notches to insure the proper movement of said table for alignment of the recesses in the table with the means located above said table and means cooperating between said two latches to exclude the second mentioned latch from engagement with the edge of the table until after said first latch has moved the table sufficiently to prevent engagement of said second latch with a notch when released.

5. In a machine for assembling the parts of snap fastener socket elements, each of which includes a casing and a spring, said casing having a number of projections, a bed portion having a plurality of casing forming dies, a rotatable casing-receiving table having a series of recesses and a rotatable spring-receiving table also supported upon said bed portion and having a series of recesses, a reciprocable head positioned above said table, die members carried by said head for cooperation with the die members of the bed portion to form the casings from a strip moved between said die members, transfer means carried by said head for moving the casings from the strip to the casing-carrying table, means carried by the head and operable to position the springs in the recesses in the spring carrying table, spring-transferring means carried by the head for moving the springs from the spring-carrying table to the casings and said spring-transferring means having portions for upsetting the projections provided on the casings to hold the springs in assembly with the casings, and ejecting means also carried by the said head for ejecting the completed socket elements from the machine.

6. In a machine for assembling snap fastener socket elements, a rotatable casing-carrying table, a rotatable spring-carrying table having a series of spring-carrying apertures and a plunger movable into and out of the spring-carrying apertures as they pass beneath the plunger, and said plunger having means at its end whereby said springs are compressed and accurately positioned in said apertures prior to being transferred to casings carried by the casing-carrying table.

7. In a machine for assembling snap fastener socket elements, a rotatable spring-carrying table having a series of spring-carrying apertures, said apertures being larger at the top than at the bottom and having notches in the side wall, a plunger movable into and out of the spring-carrying apertures as they pass beneath it, and fingers or jaw means carried by said plunger and adapted to enter said notches whereby said springs, which are first located in the enlarged parts of said apertures, may be compressed laterally by said fingers or jaw means and then may be moved to the bottoms of said apertures to position them in proper relation to said apertures.

8. In a machine for assembling snap fastener socket elements, a rotatable spring-carrying table having a series of spring-carrying apertures, said apertures being larger at the top than at the bottom and having notches in the side wall, a plunger movable into and out of the spring-carrying apertures as they pass beneath it, fingers or jaw means carried by said plunger and adapted to enter said notches whereby said springs, which are first located in the enlarged parts of said apertures, may be compressed laterally by said fingers or jaw means and then may be moved to the bottoms of said apertures to position them in proper relation to said apertures, a casing-carrying device having a series of casing-carrying apertures, means for bringing the apertures of said devices into alignment one at a time and a second plunger operable to transfer said springs to said casings.

9. In a machine for assembling snap fastener socket elements each of which includes a casing and a spring, said casing having a number of projections, a casing-carrying table having a series of casing-carrying apertures adjacent to its edge, a spring-carrying table having a series of spring-carrying apertures adjacent to its edge, means for rotating said tables, said tables located one above the other and having their centers offset so that the apertures of one intersect the apertures of the other when the tables are rotated, a plunger provided with means for properly and accurately positioning the springs in the spring-carrying apertures, a plate interposed between said tables adjacent to their intersection, an aperture provided in said plate, means projecting from said plate into the path of the apertures provided in the casing-carrying table to engage the projections on the casings thereby properly aligning them with said aperture in said plate and transfer means for forcing the springs through the aperture in said plate to the casings as the casing and spring-carrying apertures become aligned with the aperture in said plate.

10. In a machine for assembling snap fastener socket elements, a spring-carrying device having a series of spring-carrying apertures non-circular in outline, and adapted thereby to receive springs of corresponding outline in predetermined positions, said apertures being larger at the top than at the bottom, a plunger movable into and out of the spring-carrying apertures as they pass beneath it, and tapered fingers or jaw means carried by said plunger, said fingers being adapted to enter grooves in said spring-carrying device at the sides of said spring-carrying apertures, whereby said springs, which are first located in the enlarged parts of said apertures, are compressed laterally by said tapered fingers or jaw means and are then moved to the bottom of said apertures to position them in proper relation to said apertures.

11. In a machine for assembling snap fastener elements including a casing having a number of projecting portions and a spring having stud-engaging jaws, said jaws of said spring being overlapped when first placed in said casing, a casing-carrying device, means associated with said casing-carrying device for placing a spring in a casing, a series of dies associated with said casing-carrying device for clenching the projecting portion of said casing over the spring to hold it in assembly with said casing and means carried by one of said dies for spreading the jaws of the spring while the final clenching operation takes place.

12. In a machine for assembling snap fastener elements, a casing-carrying table having a series of casing-receiving recesses, means located above said table for performing various operations upon said casings during rotation of said table, notches formed in the edge of said table, a reciprocable mechanism having a latch for engagement with said notches to move said table step by step beneath said means located above said table, a second latch adapted to engage a notch in the edge of the table thereby to prevent reverse movement of the table during the release of the first mentioned latch and the return of the reciprocable mechanism, a third latch adapted to engage the notches in the edge of the table and an escapement mechanism operatively connected between the third latch and the reciprocable mechanism whereby said third latch will act as a safety device to stop the operation of the machine if the casing-carrying apertures become misaligned with the means which perform the operations on the casings carried in the said apertures.

13. In a machine for assembling snap fastener socket elements, each of which includes a casing part and a spring part, said casing part having a number of projections, a rotatable table for carrying said casings, a second rotatable table carrying the springs for said casings, automatically operating means associated with said tables for positioning the socket parts with relation to their respective tables prior to assembly and other automatically operating means for transferring the springs to the casings and upsetting the projections on the casings to secure the parts of the fastener together, gears operatively connecting said tables whereby rotation of one table produces rotation of the other, notches provided in the edge of one table, a reciprocable mechanism having a latch for engagement with said notches to move said table step by step beneath said means located above said table, a second latch adapted to engage a notch in the edge of the table thereby to prevent reverse movement of the table during the release of the first mentioned latch and the return of the reciprocating mechanism, a third latch adapted to engage the notches in the edge of the table and an escapement mechanism operatively connected between the third latch and the reciprocable mechanism whereby said third latch will act as a safety device to stop the operation of the machine if the casing-carrying apertures become misaligned with the means which perform the operations on the casings carried in the said apertures.

14. In a machine for assembling snap fastener elements, a rotary casing-carrying table having a series of casing-carrying recesses, a rotary spring-carrying table having a series of spring-carrying recesses, gears connecting said tables so that rotation of one produces rotation of the other, notches formed in the edge of one of said tables, a reciprocable mechanism having a latch for engagement with said notches to move said table step by step whereby the recesses of said tables are brought into axial alignment for transfer of the springs to the casings and a safety mechanism for automatically stopping the operation of the machine if the parts become misaligned, said safety mechanism comprising a latch for cooperation with the notches and an escapement device operatively connected between the safety latch and the reciprocable mechanism.

15. In a machine for forming socket casings and assembling wire springs with the casings, a strip of sheet metal, dies for forming the casing from said strip, means for moving the strip beneath said dies, a casing-carrying table rotatable beneath said strip and having recesses to receive the said casings, a second table offset with relation to said first table and rotatable relative thereto, means providing a number of bores in said second table to receive preformed springs, a plunger adapted to enter successively said spring-carrying bores and position the preformed springs as the table is rotated, means extending into the path of the casings and operable to position said casings during the rotation of the casing-carrying table, a transfer device operable to transfer the springs one at a time from the spring-carrying bores to the casings, and driving means operable to turn said tables in a step by step manner.

In testimony whereof, I have signed my name to this specification.

MOSES F. CARR.